Aug. 12, 1958  P. A. CHOMBARD  2,846,887
SUSPENSION FOR A VERTICAL-INDICATING GYROSCOPE
Filed Feb. 20, 1956  4 Sheets-Sheet 1

Aug. 12, 1958 P. A. CHOMBARD 2,846,887
SUSPENSION FOR A VERTICAL-INDICATING GYROSCOPE
Filed Feb. 20, 1956 4 Sheets-Sheet 2

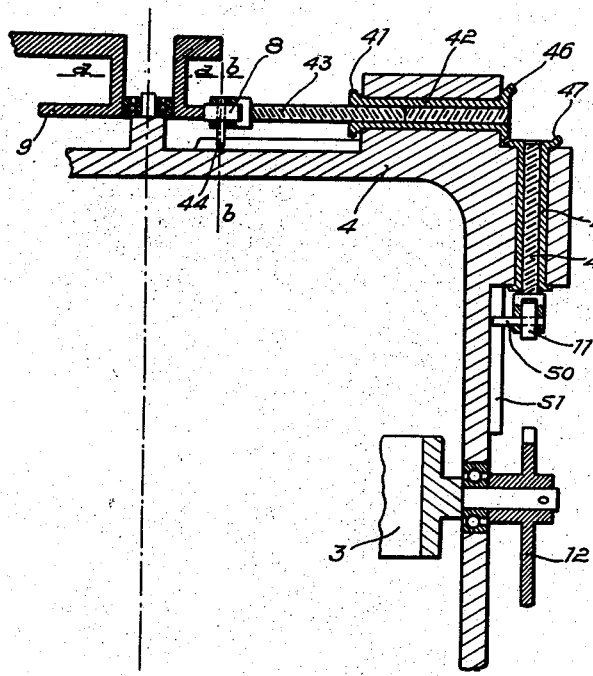

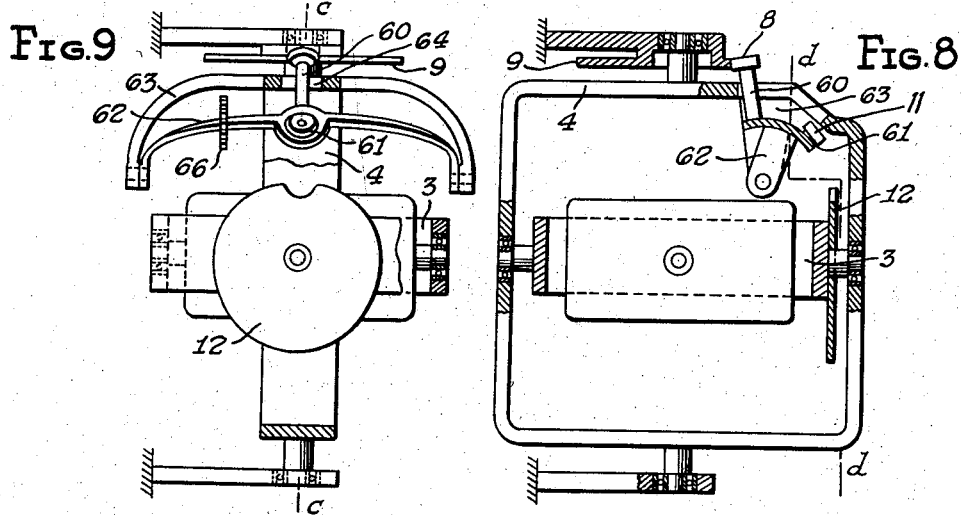
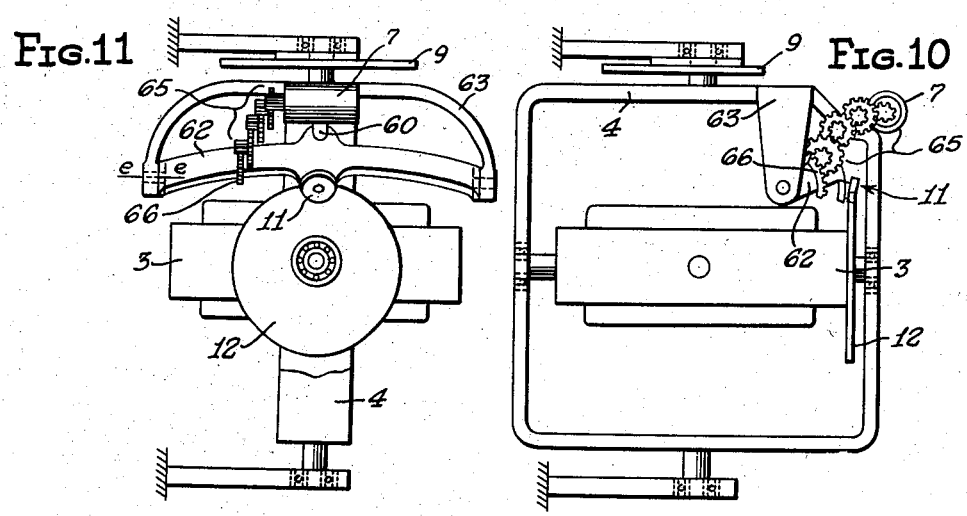
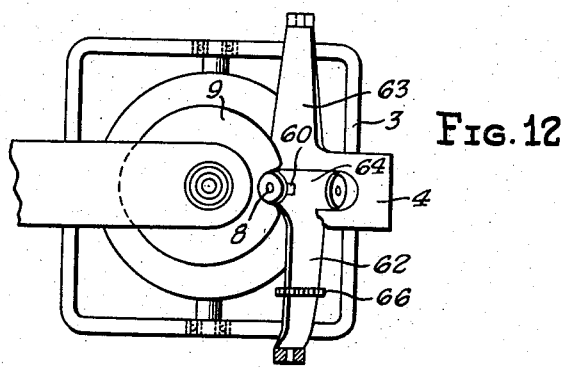

United States Patent Office 2,846,887
Patented Aug. 12, 1958

2,846,887

SUSPENSION FOR A VERTICAL-INDICATING GYROSCOPE

Pierre André Chombard, Boulogne-sur-Seine, France, assignor to Etat Français, represented by the Secretary of State for Armed Forces (Air), Paris, France Application February 20, 1956, Serial No. 566,733

Claims priority, application France February 21, 1955

12 Claims. (Cl. 74—5.2)

The present invention relates to an improved suspension for a vertical-indicating gyroscope.

The conventional Cardan suspension with two degrees of freedom of a vertical-indicating gyroscope has the well-known drawback of losing one degree of freedom in the course of evolutions which bring the outer axis of the suspension in the prolongation of the gyroscope axis. It is known also that the gyroscope can be disturbed from the moment when the angle included between these two axes becomes equal to or less than a critical angle the magnitude of which is a function not only of the characteristics of the gyroscope and of its suspension but also of the conditions under which its support moves.

Rapid erection devices or devices which can be temporarily locked by hand, currently in use, constitute mere palliatives to said drawbacks.

In order to provide a vertical-indicating gyroscope which is not liable to be disturbed, it is necessary to add further rings to the aforesaid conventional suspension. However, in this case, erratic movements of certain rings of the suspension may cause certain axes to coincide so that the benefit of the additional axes of rotation thus introduced is lost. In order to avoid these erratic movements, it is necessary to cause these rings to assume privileged positions and this leads to a substantial complication of the equipment and to further difficulties in its design.

It is to be understood in this specification that the expression "suspension ring" is used not only to designate a ring proper but also a half-ring or any other device by means of which the desired rotation is achieved.

The object of the present invention is a simple method for improving the conventional suspension of a vertical-indicating gyroscope so as to obtain a gyroscope having complete freedom whatever be the position of its support.

This method consists in adding a third suspension ring and in making use of a mechanism adapted to place this improved suspension in two different states of operation, viz: one state in which the third ring and the outer ring of the original suspension are mutually locked, a second state in which the outer ring of the improved suspension is locked with respect to the support, the said mechanism automatically causing the passage of one state to the other at the moment when one of the free axes of the suspension makes with the axis of the gyroscope an angle α of predetermined amplitude which is greater than the greatest possible value of the critical angle, so that the suspension ring whose axis makes an angle equal to or less than α with the gyroscope axis is automatically locked and replaced by another ring which is placed substantially in the optimum conditions.

Another object of the invention is to provide forms of embodiment of the improved suspension making use of the present method, essentially characterised by a third suspension ring, by a locking member arranged on each of the two outer rings enabling them to be locked, viz: the outermost ring with respect to the support, the other with respect to said outermost ring, by an electric motor secured to the outer suspension ring, the axis of said motor being preferably perpendicular to the axis of said ring, whereby when acting on the above locking members this motor can successively unlock one of the two said suspension rings and lock the other at the moment when the angle between the gyroscope axis and the free axis of one of the two outer suspension rings passes through the predetermined value α greater than the critical value, the reverse operations being carried out when the said angle passes back again through this value α, and by means for materializing the predetermined angle α, actuating the above motor.

It should be pointed out that the locking of the locking member of a spindle must be carried out gradually and not abruptly so as to avoid a critical operation at the moment when passing from one state of operation to the other. To the same end, locking could be carried out at a slightly larger angle than that at which the previous unlocking took place.

The suspension according to the invention has the following advantages:

A single ring is added to the conventional Cardan suspension. The bulk, weight and additional complication are therefore reduced to a minimum. It is simpler to lock and unlock rings by means of a motor than to have them controlled by a servo-mechanism since the latter must be able to follow up without undue error the very rapid movements caused by the high angular speeds of evolution of the support;

For any of the attitudes of the support remote from the critical positions, the present suspension operates in the same way as the conventional suspension of vertical-indicating gyroscope, thus facilitating the use of the vertical reference;

In the critical positions, the gyroscope is provided with a suspension which is very favourable to its operation since the free axes thereof are nearly orthogonal:

During the transitory periods of locking and unlocking, the latter necessarily starting before the former, the suspension cannot lose a degree of freedom.

Other features and advantages of the invention will appear in the course of the ensuing description with reference to the accompanying drawings in which:

Figs. 5, 6 and 7 are views of a first embodiment of the mechanism for placing the suspension in two different operational states, one of said views being a section through the mean plane of the outer ring, the other two views being sections respectively along the lines a and b of Fig. 5;

And Figs. 8 to 12 are views of a second embodiment of the aforesaid mechanism, Figs. 8 and 9 being respectively sections along line c of Fig. 9 and along dot-and-dash line d of Fig. 8, Figs. 10 and 11 being elevations viewed from the same point as Figs. 8 and 9 respectively and Fig. 12 being a plan view corresponding to the position of Fig. 8, with a partial section along line e of Fig. 11.

Figure 1:
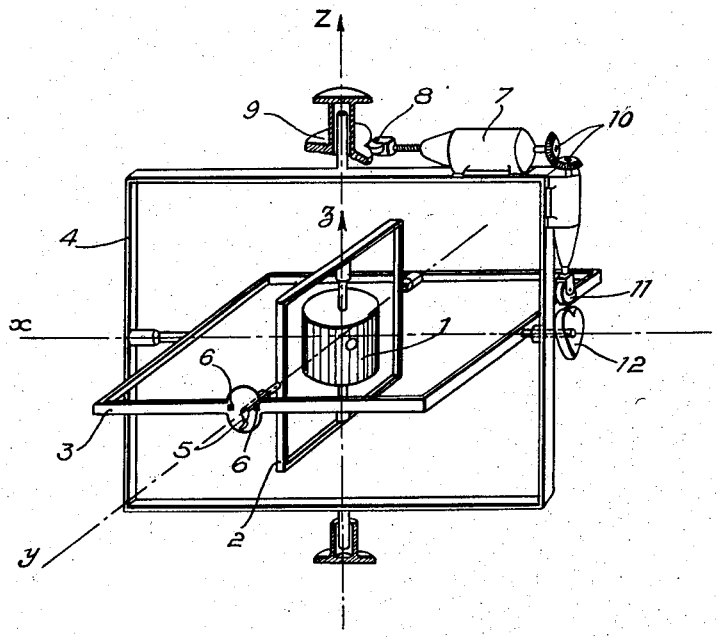
Fig. 1 is a diagram of the suspension according to the invention comprising an outer ring additional to the two rings of the conventional suspension.

In Figure 1, the vertical-indicating gyroscope 1 is suspended through the medium of conventional cardan rings 2 and 3 and of an additional ring 4 mounted outside the rings 2 and 3.

A brush 5 is secured to one of the ends of the axis $0y$ of ring 2 and the ring 3 comprises two studs 6 and 6a arranged in such a manner that the brush 5 sweeps over one of these two studs while the angle between the axis $0z$ of the gyroscope and the axis $0x$ of ring 3 is equal to the angle $\alpha$, the disturbances which are to be eliminated appearing when said angle is less than $\alpha$.

A motor 7 is secured to the additional ring 4 so that its spindle is perpendicular to the axis $0z$ and can directly control a roller 8 and apply it against a heart-shaped cam 9 secured to the support. Through the medium of the bevel pinion 10, the motor 7 can control the roller 11 and apply it against a heart-shaped cam 12 secured to the spindle of ring 3. The operation of this device is such that if one of the rollers 8 and 11 is applied into the recess of one of these heat-shaped cams 9—12, the other roller is disengaged from the corresponding heart-shaped cam.

The motor 7 is connected to studs 6 and 6a by means of circuits which have not been shown.

Figure 2:
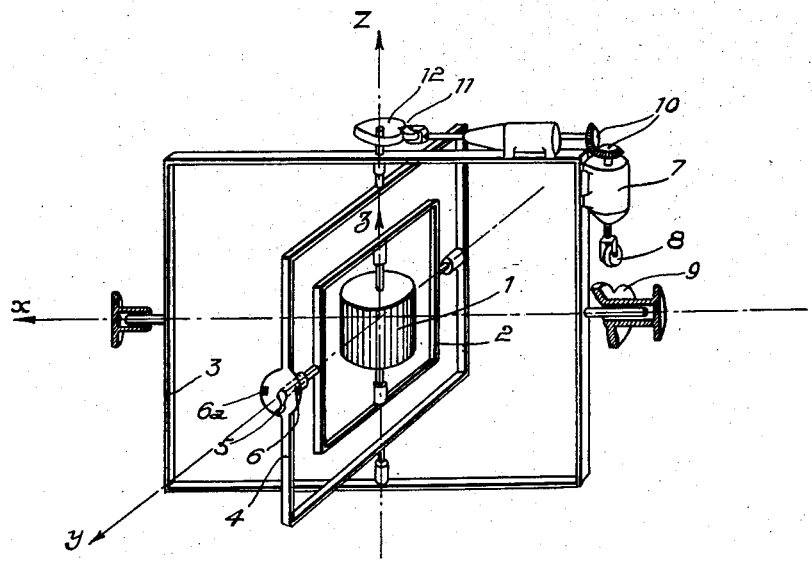
Fig. 2 is a diagram of a modification in which the additional ring is interposed between two rings whose axes are arranged in a conventional manner.

In the modification according to Figure 2, in which the references already used in Figure 1 designate the same parts, the second cardan ring of the original suspension can be represented by the two rings 3 and 4 which are mutually integral. The additional ring 4 is here interposed between the rings 2 and 3.

The motor 7 is placed on the ring 3 so that its spindle is perpendicular to the axis $0x$.

The operation of the device is as follows:

In the position shown in Figure 1, the improved suspension according to the invention operates as a conventional suspension with two cardan rings 2 and 3 since the additional ring 4 is locked with respect to the support, the motor 7 maintaining the roller 8 applied to the hollow portion to the heart-shaped cam 9. If the aircraft is in the course of nose-diving or nose-lifting to a gradually increasing extent, the angle between the gyroscope axis $0z$ and the outer axis of the suspension $0x$ decreases more and more.

At the moment when this angle passes through a value equal to $\alpha$, the brush 5 sweeps over the stud 6 or 6a and closes a circuit leading to the motor 7. This motor then releases the roller 8 from the cam 9 and thereafter applies the roller 11 against the heart-shaped cam 12. In view of its shape, this cam 12 starts rotating and rotates with it the ring 3, which is integral therewith, about their common spindle until the roller 11 is applied to the hollow portion of the cam 12, at which time the latter stops rotating. Ring 3, whose axis $0x$ has come too close to axis $0z$ of the gyroscope 1, being locked to ring 4, is replaced by said ring 4 whose axis has been rendered free by the withdrawal of the roller 8 from the heart-shaped cam 9. This ring 4 is placed in the optimum position with respect to the gyroscope axis.

If the aircraft returns to horizontal flight, the same operations are carried out in the reverse order; the roller 11 is first withdrawn from the cam 12 and the roller 8 is then applied to the cam 9. The unlocking and locking operations require a certain amount of time during which the suspension has one excess axis of rotation, but this is not a drawback.

The operation of the suspension corresponding to the embodiment of Figure 2 is exactly the same.

It is pointed out that if the support rotates through 90° in the plane of the figure, the suspension illustrated in Figure 2 assumes the configuration of the suspension shown in Figure 1.

Figure 3:
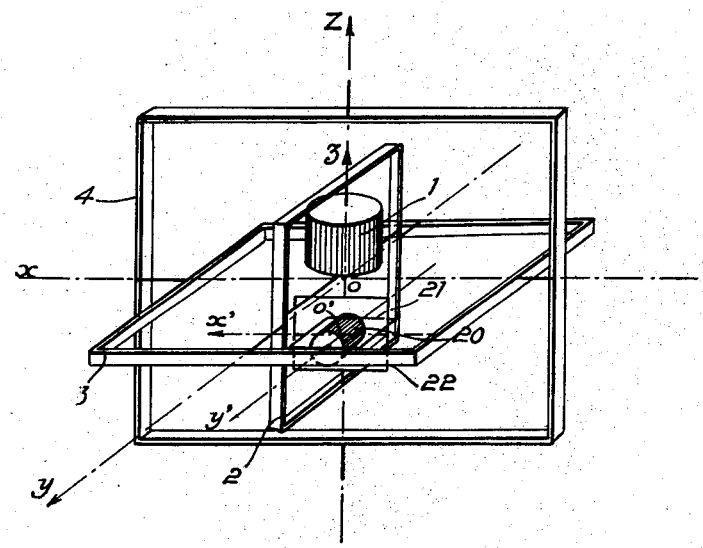
Fig. 3 is a diagram of the improved suspension in which the inner ring comprises a directional gyroscope.
Figure 4:
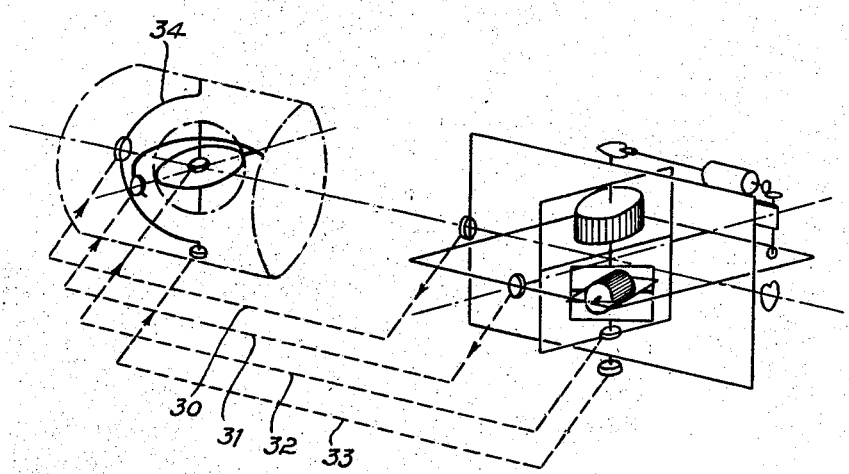
Fig. 4 is a diagram of the connections between the improved suspension and a repeater.

In Figure 3, the inner suspension ring 2 carries, in addition to the vertical-indicating gyroscope 1, a directional gyroscope 20 through the medium of two conventional suspension rings 21 and 22;

Fig. 4 shows the present invention as applied to an arrangement wherein the indications of the reference gyroscopes are reproduced in a repeater remote from the said gyroscopes.

The electric connections of any known type (autosynchronous, potentiometric, etc.) adapted to transmit the movements of the various spindles of the master reference gyroscope to the corresponding spindles of the repeater are shown in dotted lines at 30, 31, 32 and 33.

The relative arrangement of the repeater spindles is similar to that of the spindles of said master reference gyroscope.

In this repeater, the representation of the attitude and of the course of the aircraft is obtained by any known method. For example, the transmissions 30 and 31 stabilize a circular platform at the centre of which a spindle perpendicular thereto is actuated by the transmission 32. This spindle is integral with two hemispheres whose edges merge with those of the platform, in order to give the appearance of a complete sphere which is stabilised in space.

It is pointed out also that the repeater in nowise requires the use of a locking and unlocking system similar to that of the gyroscopic reference, the true repetition of the movements of the suspension rings of the latter being alone necessary to ensure a correct operation.

It is quite obvious that the use of a vertical reference alone or of a combined vertical and course reference enables not only combined vertical and course repeaters to be fed but also separate repeaters, and that the repeaters, whatever they may be, incorporated with any equipment, in case they do not have to be used for all attitudes of the aircraft, must be provided with the simplest suspension compatible with their conditions of use.

In Figs. 5, 6 and 7, showing a first possible form of embodiment of the mechanism for putting the gyroscope suspension in two different operational states, the motor 7, whose spindle is parallel to the mean plane of the suspension ring 4 and perpendicular to the axis of rotation of the latter, actuates an intermediary gear 40 which in its turn actuates the gear 41, secured to the screw-threaded sleeve 42, adapted to rotate in the ring 4 about an axis located in the mean plane of the said ring.

Inside the sleeve 42, moves the screw-threaded rod 43, carrying at its end the roller 8, the spindle of which is extended towards the ring 4 to form a guide 44 which moves in the groove 45. In the position shown in Figs. 5 and 6, the roller 8 is located in the hollow portion of the heart-shaped cam 9.

At its other end, the screw-threaded sleeve 42 is integral with a bevel pinion 46 meshing with another bevel pinion 47 secured at one of the ends of a second screw-threaded sleeve 48 adapted to rotate about an axis located in the mean plane of the ring 4.

A screw-threaded rod 49 extends into the screw-threaded sleeve 48 and, as the rod 43, carries at its end a roller 11 the spindle of which is extended so as to form a guide 50 movable in the groove 51.

The operation of the device is as follows:

One of the rollers 8 or 11 being located in the hollow portion of the corresponding cam 9 or 12, and the motor 7 starting to rotate in one direction or the other at the moment when the angle between the axis of the gyroscope and the outer axis of the suspension passes through the value $\alpha$, the motor rotates the sleeve 42 which causes on the one hand one of the rollers to retract from the heart-shaped cam with which it was in contact and causes on the other hand the other roller to come into contact with the corresponding heart-shaped cam.

In Figs. 8 to 12, showing a second possible form of embodiment of the mechanism for putting the gyroscope suspension into two different states of operation, the rollers 8 and 11 are supported at the end of rods 60 and 61 integral with an arcuate member 62 adapted to pivot about two spindles carried at each end of another arcuate member 63, integral with the outer ring 4.

The axes of the rods 60 and 61 are in the mean plane of this ring 4 and form a certain angle. The ring 4 comprises an opening 64 through which passes the rod 60.

The motor 7 is also integral with the ring 4 and its spindle is perpendicular to the mean plane of this ring. It actuates, through the medium of a train of gears 65, a toothed sector 66 integral with the pivoting member 62.

The operation of the device will be obvious from the following explanation:

Assuming that the roller 8 is at the start in the hollow portion of the heart-shaped cam 9, as in Figs. 8, 9 and 12, and if the motor 7 then starts rotating, the pivoting arcuate member 62 is driven by its toothed sector 66 driven by the gear train 65 and the roller 8 is retracted from the heart-shaped cam 9. The arcuate member 62 rotates through an angle such that the roller 11 comes into contact with the heart-shaped cam 12, causes it first to pivot, then to come to a standstill and places itself in its re-entrant portion, see Figs. 10 and 11.

The same operations are carried out in the reverse order when the roller 11 is at the start in the re-entrant portion of the heart-shaped cam 12.

It is to be understood that the present invention has only been described and illustrated in a purely explanatory manner without any intention to limit the same and that alterations of detail can be made therein without falling outside its scope.

I claim:

1. Improved suspension for a vertical-indicating gyroscope for overcoming the operational defects which occur in conventional two-ring cardan suspensions when the angle between the outer axis of the said suspension and the axis of the gyroscope becomes equal to or lower than the critical angle, comprising a third suspension ring, means for putting this improved suspension in two different states of operation, viz.: one state in which the third suspension ring and the outer ring of the original suspension are mutually locked, and a second state in which the outer ring of the improved suspension is locked relatively to the support, and means for automatically controlling the passage from one state to the other at the moment when one of the free axes of the suspension makes with the axis of the gyroscope an angle of a predetermined value α greater than the largest possible value of the critical angle so that the suspension ring whose axis makes with the gyroscope axis an angle equal to or less than α is automatically locked and replaced by another ring which is placed in substantially the optimum conditions.

2. Improved suspension according to claim 1 wherein the means for putting the improved suspension in two different operational states are constituted by a locking member arranged on each of the two outer rings and which enables them to be locked, viz.: the outermost ring with respect to the support, and the other ring with respect to said outermost ring, by an electric motor secured to the outer suspension ring and by mechanical means arranged between the said motor and the said locking members and acting on said members to successively unlock one of the two suspension rings under consideration and lock the other at the moment when the angle made by the gyroscope axis with the free axis of one of the two outer suspension rings passes through the predetermined value α greater than the critical value, the reverse operations being carried out when the said angle thereafter passes back through said value α.

3. Improved suspension according to claim 2 wherein the means for automatically controlling the passage from one operational state to the other are constituted by a brush and by studs inserted in the supply circuit of the motor and respectively mounted on the end of the spindle of the inner suspension ring and on the intermediary ring, in such a position that the contact between a stud and the brush occurs when the angle between the gyroscope axis and the axis of the suspension which effectively rotates in the support is equal to the predetermined angle α.

4. Improved suspension according to claim 2 wherein the locking member of the outer suspension ring comprises on the one hand a heart-shaped cam integral with the gyroscope support and on the other hand a roller the engagement of which with the said cam is directly controlled by the motor.

5. Improved suspension according to claim 2 wherein the locking member of the intermediary suspension ring comprises on the one hand a heart-shaped cam secured to the spindle of the said ring and on the other hand a roller whose engagement with the said cam is controlled by the motor.

6. Improved suspension according to claim 1 wherein the means for putting the improved suspension in two different operational states comprises a first heart-shaped cam integral with the gyroscope support, the axis of this cam coinciding with the axis of the outer suspension ring, and a first roller for locking this outer ring with respect to the said support, a second heart-shaped cam secured to the spindle of the intermediary suspension ring and a second roller for locking this intermediary ring with respect to the outer ring, an electric motor secured to the outer ring and having its axis parallel to the median plane of this ring, a first screw-threaded sleeve, whose axis is situated in the said median plane, a gear secured to each of the two ends of said sleeve, an intermediary gear between said motor and one of said two gears secured to the sleeve, a screw-threaded rod extending in screw-threaded engagement into the said sleeve and carrying the said first roller at its free end, an extension of the spindle of said roller being guided in a groove made on said ring in its median plane, a second screw-threaded sleeve whose axis also lies in the median plane of the ring and is perpendicular to the axis of the said first sleeve, a gear secured to one of its ends and meshing with the corresponding gear of the first sleeve, a screw-threaded rod in screw-threaded engagement at one of its ends within the second sleeve and carrying the said second roller at its other end, an exension of the spindle of said roller being guided in an opening made on the ring in its median plane, so that when the motor is started, one of the two screw-threaded rods retracts its roller from one of the heart-shaped cams whilst entering further into the corresponding screw-threaded sleeve, whereas the other screw-threaded rod, through the medium of its roller, first causes the other heart-shaped cam to rotate and then to come to a standstill whilst said rod is withdrawn to its maximum from the corresponding sleeve.

7. Improved suspension according to claim 1 wherein the means for putting the improved suspension in two different operational states comprise a first heart-shaped cam integral with the gyroscope support the axis of this cam coinciding with the axis of the outer suspension ring, and a first roller for locking this outer ring with respect to the said support, a second heart-shaped cam secured to the spindle of the intermediary suspension ring and a second roller for locking this intermediary ring with respect to the outer ring, an electric motor secured to the outer ring and having its axis perpendicular to the median plane of this ring, an opening in said ring, a first arcuate member perpendicular to said ring and integral therewith, a second pivoting arcuate member pivoted to the ends of the first arcuate member and carrying on the one hand, in the median plane of the outer suspension ring, two rods each carrying one of the said rollers at their free end, one of said two rods passing through the said ring opening, and on the other hand a toothed sector, a gear train between the said motor and the said toothed sector, so that when the arcuate member pivots as the motor starts, it leaves one of its extreme positions in which one of the rollers is retracted from the corresponding heart-shaped cam, whereas the other roller first causes the other heart-shaped cam to rotate and thereafter brings it to a standstill.

8. Improved suspension according to claim 1 wherein the third suspension ring is placed outside the two conventional rings.

9. Improved suspension according to claim 1 wherein the third suspension ring is placed between the two conventional cardan rings.

10. Improved suspension according to claim 1 wherein the inner ring carries a directional gyroscope suspended by two conventional cardan rings.

11. Improved suspension according to claim 10 wherein the three axes of the suspension of the vertical reference gyroscope and the vertical axis of the suspension of the directional reference gyroscope carry the transmitting element of an electric transmission device of known type for transmitting the movements of rotation of one spindle to another, the corresponding receiving element being mounted on the spindle of a repeater, none of the spindles of the repeater needing any locking member.

12. Improved suspension according to claim 11 wherein the repeater is separated into several distinct parts the spindles of each of these parts being connected to the corresponding spindles of the reference gyroscopes.

References Cited in the file of this patent

UNITED STATES PATENTS

| 2,450,875 | Braddon et al. | Oct. 12, 1948 |
| 2,561,367 | Haskins | July 24, 1951 |

FOREIGN PATENTS

| 1,099,924 | France | Mar. 30, 1955 |